United States Patent [19]

Pan

[11] Patent Number: 4,511,034

[45] Date of Patent: Apr. 16, 1985

[54] COMPUTER DISKETTE CASES

[76] Inventor: You-Chwen Pan, 3 Fl-5, No. 28, Jen Ai Rd. Sec. 3, Taipei, Taiwan

[21] Appl. No.: 603,062

[22] Filed: Apr. 23, 1984

[51] Int. Cl.³ ............................................. B65D 85/30
[52] U.S. Cl. .................................... 206/310; 206/312; 206/444; 206/449; 206/555
[58] Field of Search ............... 206/444, 310, 311, 312, 206/449, 555

[56] References Cited

U.S. PATENT DOCUMENTS

| | | | |
|---|---|---|---|
| 2,663,416 | 12/1953 | Hirsch | 206/310 |
| 3,949,872 | 4/1976 | Paudras | 206/310 |
| 4,040,105 | 8/1977 | Slindee | 206/444 |
| 4,084,690 | 4/1978 | Pulse | 206/310 |
| 4,327,831 | 5/1982 | Inaba et al. | 206/310 |

Primary Examiner—Joseph Man-Fu Moy

Attorney, Agent, or Firm—Armstrong, Nikaido, Marmelstein & Kubovcik

[57] ABSTRACT

A kind of diskette case includes left and right case bodies. A flange is set on the periphery of the interior side of each case body. A cylinder is set on the center of each case body. By means of the sturdy structure of periphery flange and cylinders this case can protect diskette held therein from being damaged by outside physical changes, dust, dirt, moisture, sunlight etc. An elastic tongue plate with semi-circular opening on its center of edge of upper side is connected to the lower side of the right case body to allow diskette can be pulled out from and put into the case with fingers very easily after opening the case. Meanwhile a label used to fill out diskettes number and name is provided to stick on case's back for easy-finding.

3 Claims, 7 Drawing Figures

COMPUTER DISKETTE CASES

BACKGROUND OF THE INVENTION

During the condition that the employment of computer is getting popular, several biggest headaches are caused to all programmers and computer users. One of them is how to store and carry their valuable software in a safe, convenient and systematic way.

Usually we might have to take hundreds of man hours to develop and maintain a perfect diskette file, but it can take less than one second to ruin it. For example: writing on a piece of paper that just happens to be sitting atop a diskette which was left on desk is all that needed.

Diskette is much thinner than record. Due to its character of material, the diskette is very easily damaged by dirt, dust, oil, pressure, sunlight, magnet, moisture and folding etc. The main business of diskette manufacturers is producing blank diskettes. Although they understand they should provide sufficient protection devices for their diskettes, but under the consideration of keeping a lower selling cost those manufacturers only add a paper sleeve to each diskette, and then 10 pcs. to a paper box or plastic box. This method sure can save makers' selling cost, but from actual experience in using diskettes we have found several defects which listed below:

(1) Paper sleeve would be easily damaged or worn out to broken under constant using.
(2) Due to paper sleeve's light weight and thin thickness, it would easily cause users to forget to insert diskette into paper sleeve after using. And therefore lose paper sleeve soon.
(3) From a plastic box holding 10 pcs, to look up particular diskette it would take longer time as he has to check its number or file name piece by piece. Meanwhile, if one owns a great number of diskettes and in case he put a particular diskette into a 10 pc-box incorrectly, then he might need few hours to find it from all his 10 pc-boxes.
(4) Pulling out diskette from a 10 pc box, it would fold diskette very easily.

Now a days that personal computers are becoming popular gradually and their functions are also getting better. A lot of works which should be done in office can be brought to home to finish and then take the result back to office. Consequently, the public need a suitable case to carry diskette.

In business transaction, delivering message and passing data we might need to put diskette into a case to send it to other person through the mail. Therefore, it is necessary for us to own a case which is of sturdy structure, light weight and suitable size for putting into normal paper envelope.

If we can design a case which appearance likes a book, a piece holds a diskette, and this case can be displayed on book shelf, meanwhile on its back a label filled out number and file name of diskette is stuck, then for us to look up particular diskette would be as easily as to find a book in library. Saves time and saves labor.

There are a lot of places should be cared in storing diskette and the standard required to protect diskette is much higher than general goods'. Currently marketed protective cases for diskettes only can meet part of the requirements specified above, or even they can meet with all the requirements, but due to their complex structure and expensive producing cost, so far it still makes general computer users are unable to share the advantage and convenience from those makers' designs or inventions with lower price.

As a result, a special kind of diskette case which has simple but sturdy structure, perfect protection against dust and pressing and sunlight and magnet and temperature, suitable size for carrying and mailing safely, lower producing cost, and can be easily filed and used in any circumstances would solve all the headache problems of modern programmers and computer users in storing, carrying and mailing their valuable software forever. Accordingly this kind of diskette case as stated above has the necessity and value for researching and developing.

SUMMARY OF THE INVENTION

The main object of the present invention is that by means of the structures of the flanges and cylinders it can make this case sturdy enough to resist unexpected physical changes which come from outside such as hitting, striking, pressing etc. Therefore, it is specially suitable for mailing and carrying diskette.

Another object of the present invention is that by means of the design of two cylinders we can put the central hole of diskette around the outside of the small cylinder. After closing the case the top surface of the large cylinder will first press the rim of the semi-circular opening of the tongue plate and then press the top surface of the small cylinder. In this condition, two cylinders and tongue plate joint together to avoid diskette held therein moving its position to hit the inside-walls of flanges of the case and decrease the noise comes from hitting walls while carrying or mailing diskette.

Another object of the present invention is that by means of the design of the character of bendability of the elastic tongue plate, it can hold diskette in a firm position after closing the case. When the case is open, the tongue plate will be released to its originally set angle. Meanwhile, the diskette would follow the changing of angle of tongue plate to slope to the same degrees accordingly. In this angle the diskette can be pulled out and put into the case smoothly without folding by user's fingers.

Another object of the present invention is to provide a special kind of diskette case and by means of its design of peripheral flanges, after closing, the flanges will be completely and tightly mated with each other to protect diskette held therein against the changes of moisture and temperature of the air of outside. This case is specially suitable for the storage of single or a small number of diskette.

Another object of the present invention is that by means of the design of self-stick label we can fill out the number and the file name of diskette and then stick it on case's back to make users to look up particular diskette easily.

DETAILED DESCRIPTION OF THE INVENTION

Figure 1:
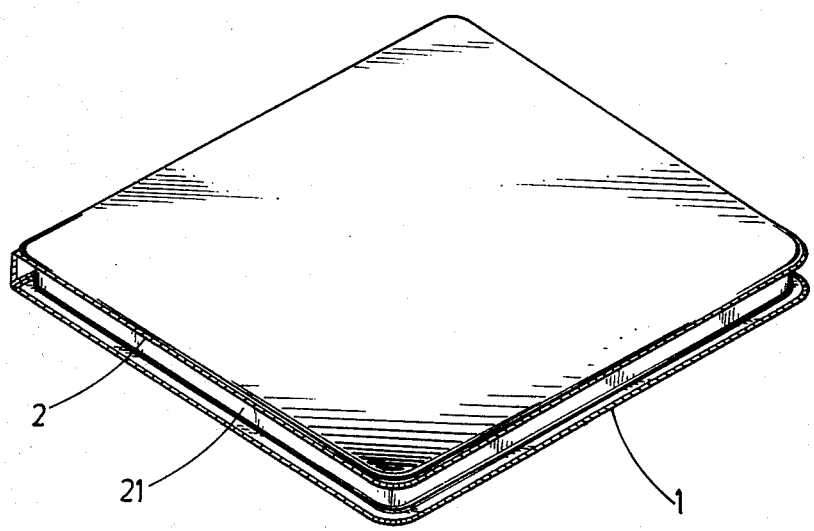
FIG. 1 is a perspective view of the present invention when case is closed.
Figure 2:
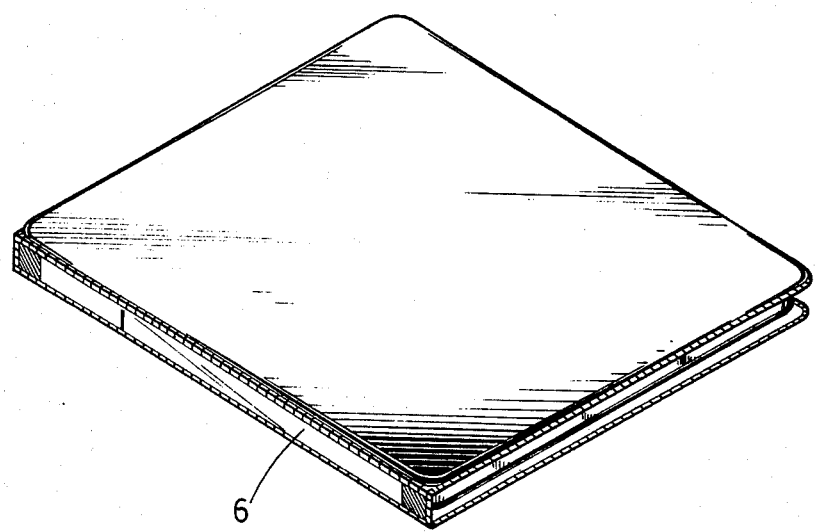
FIG. 2 is another perspective view of the present invention showing the case's back for self-stick label when case is closed.
Figure 3:
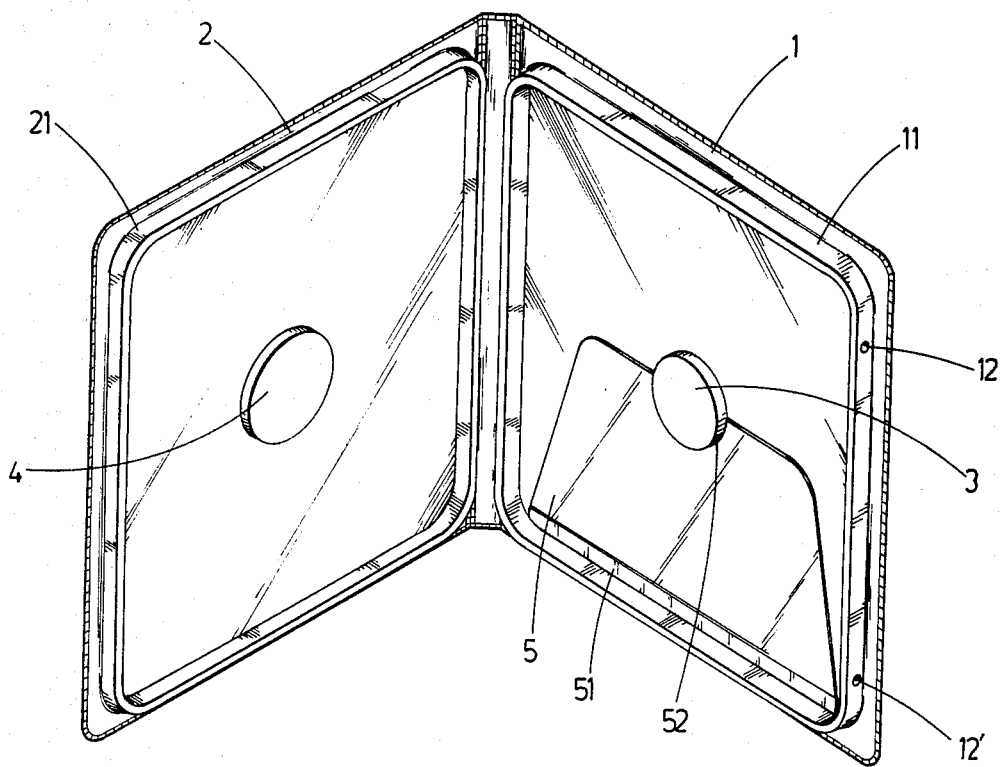
FIG. 3 is a perspective view of the present invention when case is opened.
Figure 4:
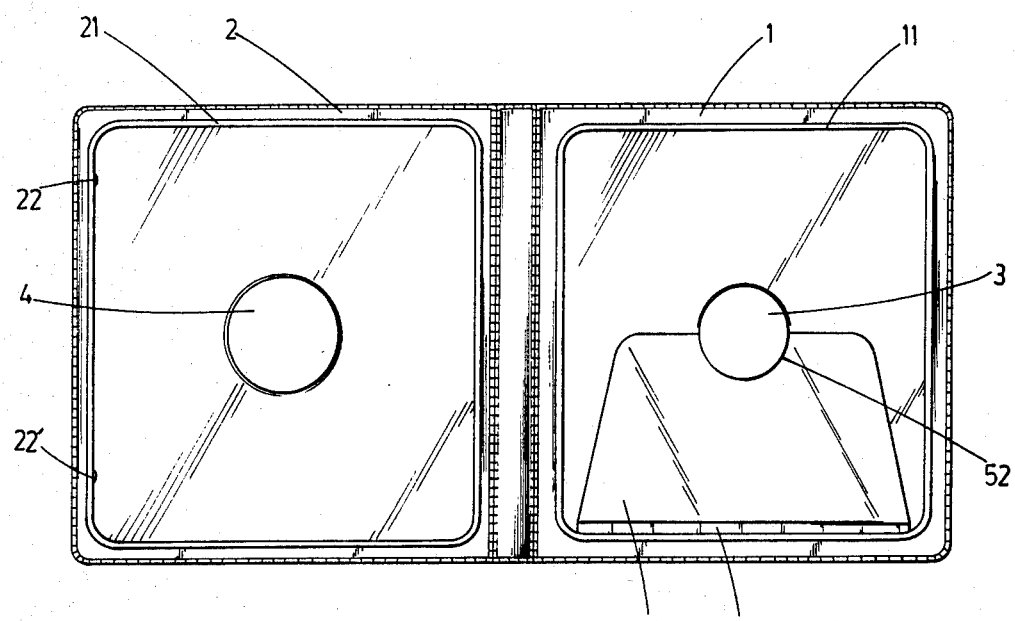
FIG. 4 is the top view of the present invention when case is opened.
Figure 5:
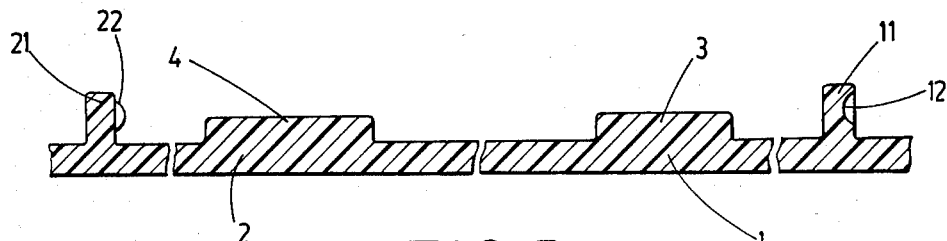
FIG. 5 is the cross-section view of the present invention when case is opened.

As shown in the drawings this invention includes two parts, the left case body (2) and the right case body (1). In the right case body:

(A) Flange (11) is set up around the sides.

(B) Two recessed holes of half-round style (12,12') are established in the exterior side of the right side of the above flange.

In left case body:

(A) Flange (21) is also set up around the sides.

(B) Two protruded balls of half-round style (22,22') are also established on the interior side of left side of above flange.

The sizes and shapes of aforesaid two flanges are almost the same, and both can be engaged with each other in order to close the case tightly as shown in FIG. 1.

There is a cylinder (3) in the center of right case body and its diameter is shorter than the diameter of central hole of the diskette. There is another cylinder (4) in the center of the left case body and its diameter is longer than the diameter of central hole of the diskette.

Figure 6:
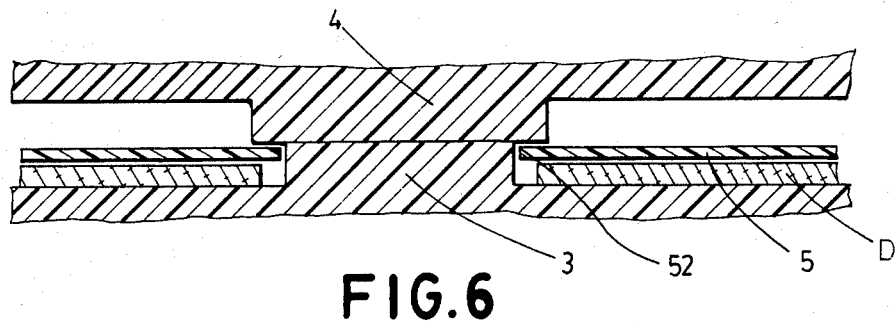
FIG. 6 is the cross-section view of the present invention showing the positions of two cylinders, tongue plate and diskette held therein when case is closed.
Figure 7:
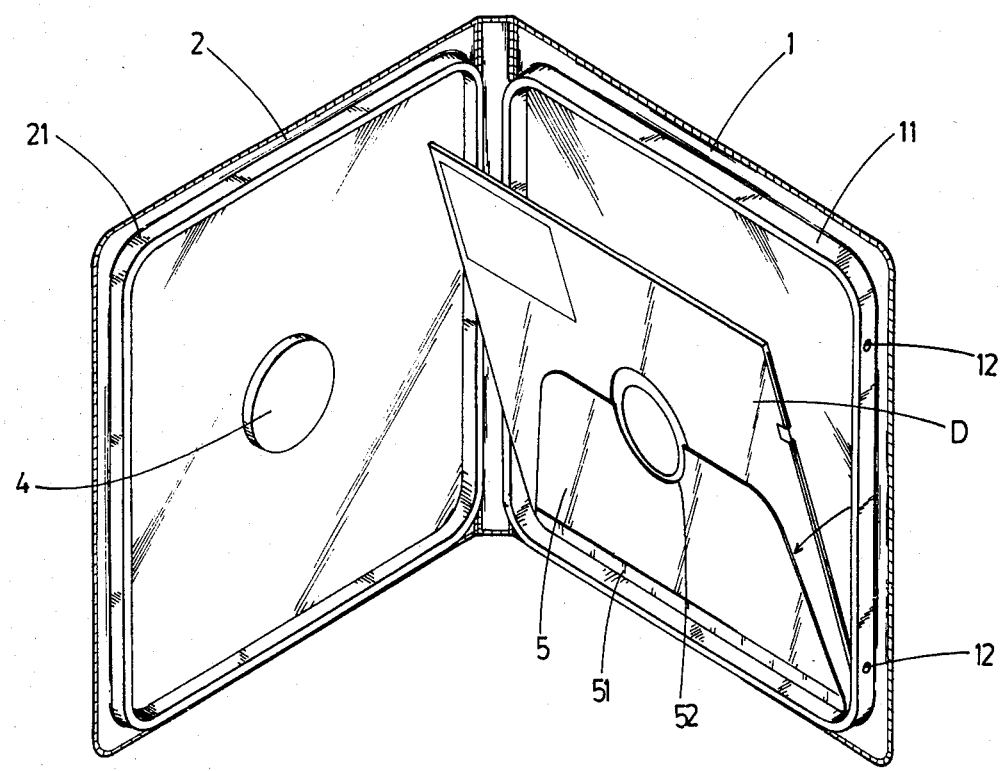
FIG. 7 is a perspective view of the present invention showing the positions of tongue plate and diskette held therein when case is opened.

An elastic and thin tongue plate (5) is connected to the lower side (51) of right case body. On the center of edge of the upper side of the tongue plate there is a semi-circular opening (52). Its diameter is just a little longer than the diameter of the cylinder (3) but is shorter than the diameter of the cylinder (4). In addition, a label (6) is stuck on the exterior side of the back of the case. Please refer to FIG. 6 and FIG. 7, the steps to use this invention are listed below:

(A) According to the number and file name printed on the label of the case to look up the diskette needed.

(B) After finding it, open this case.

(C) When this case is opened, the tongue plate (5) will be released from the pressing of the cylinder (4) of left case body to an originally set angle. In the same time, the diskette (D) held therein will also bend to the same angle accordingly.

(D) Then pull out diskette with fingers along the side of the tongue plate.

(E) After using the diskette, put it into the space of the angle between the tongue plate and the right case body along the sides of flange with fingers until the edge of the diskette touches the connected part (51) of the tongue plate.

(F) After positioning diskette, move left case body toward right case body. In this process, the top of the cylinder (4) will first press the rim of the semi-circular opening (52) of the tongue plate and push the whole tongue plate (5) and the diskette (D) together toward the face of the right case body until the top of the cylinder (4) touches the top of the opposite cylinder (3).

(G) In the closing process of the case body, the insides of flange (21) of left case body will cover around the outsides of the opposite flange (11). And the protruded half round balls (22,22') will also engage into the recessed half-round holes (12,12') located in the opposite direction to make a firm closure.

(H) After closing, put this case into an envelope to send diskette to other place through the mail or put case back on book shelf for filing.

Summing up the above statements, by means of the ingenious designs and matings of flanges, cylinders, protruded balls, recessed holes, tongue plate and its opening, this invention can reach following effects.

(A) Sturdy structure:
The design of flange set around the sides of each case body and the design of cylinder of each case body provide more resistance for diskette to unexpected physical changes such as hitting, pressing, striking etc.

(B) Overall and excellent protection:
After closing the case, by means of the design of the crests and roots of both flanges can effectively prevent the dust, dirt, moisture, temperature, sunlight etc. from coming in the case. Therefore, it keeps the air always dry in the case and then enchances the safety guarantee for diskette held therein.

(C) Convenient in taking out diskette:
When opining the case, the tongue plate will be released to a set angle and makes the diskette held therein can be taken out smoothly and easily by user's fingers. Therefore, it can avoid any folding damages caused by user's fingers, and decreased largely the chance to cause magnetic changes by touching the exposed part of diskette.

Although the motive of this invention is concepted on the purpose of protecting diskette, but its structure can be modified to hold record, video disk etc.

Based on the statments above, this invention can definitely provide a protective case for diskette especially to hold single piece or a small number of diskettes. In the meantime, it can be used for mailing, carrying diskette. Therefore, it can meet the requirements of the public and sure has the practical value.

Besides, the above description and attached drawings is only one of the embodied examples of this invention. So, partial improvements which can be made within the substantial spirit of this invention should be covered in the range of the appended claims of this invention.

I claim:

1. A computer diskette case, comprising a left case body (2) and a right case body (1), wherein a flange (11), (21) is set around a periphery of each case body such that said flanges (11), (21) can mate tightly with each other when said case is closed, and provided with a first cylinder (3) centrally disposed on said right case body (1) and having a top surface and a diameter smaller than the diameter of a center hole of a diskette and a second cylinder (4) centrally disposed on said left case body (2) and having a top surface and a diameter larger than the diameter of said center hole of said diskette, and an elastic tongue plate (5) connected on a lower portion (51) of said right case body and having a semi-circular opening (52) centrally formed in an upper end thereof, said semi-circular opening (52) having a diameter larger than said first cylinder (3) but smaller than said second cylinder (4), whereby when said case is closed said top surfaces of said first and second cylinders (3), (4) contact one another in cooperation with said elastic tongue plate (5) such that a diskette contained in said case is clamped between said elastic tongue plate (5) and said right case body (1) by the pressing of said second cylinder (4) thereon while said first cylinder (3) is encircled by a center hole of said diskette and when said case is opened said elastic tongue plate is released to a set angle with respect to said right case body to allow said diskette to be removed from said case.

2. A computer diskette case according to claim 1, wherein a pair of recessed half-round holes are located exteriorly of a right side of said flange of said right case body and a pair of mating half-round projections are located interiorly of a left side of said flange of said left case body, whereby said projections and said holes may firmly engage with each other when said right and left case bodies are closed.

3. A computer diskette case according to claim 1, wherein a self-stick label is provided on an external side of a back of said case.

* * * * *